3,842,051
PHOTOPOLYMERIZABLE COPOLYMERIC
COMPOSITIONS
Richard J. Himics, Lake Hiawatha, N.J., assignor to Sun
Chemical Corporation, New York, N.Y.
No Drawing. Continuation-in-part of application Ser. No.
44,534, June 8, 1970, now Patent No. 3,759,942. This
application Sept. 25, 1972, Ser. No. 291,920
Int. Cl. C08f 19/00; C09d 11/10; C09j 7/02
U.S. Cl. 260—78.5 E                          18 Claims

ABSTRACT OF THE DISCLOSURE

Polymers containing derivatives of 1-aza-5-hydroxymethyl-3,7-dioxabicyclo [3.3.0] octane are radiation-curable and suitable for use in printing inks, coating compositions, adhesives, and the like.

---

This application is a continuation-in-part of copending application Ser. No. 44,534, filed June 8, 1970, now U.S. Pat. No. 3,759,942.

This invention relates to new and novel organic compounds and, more particularly, to radiation-curable derivatives of 1-aza-5-hydroxymethyl - 3,7 - dioxabicyclo [3.3.0] octane.

In accordance with this invention, polymers derived from esters and salts having the structure

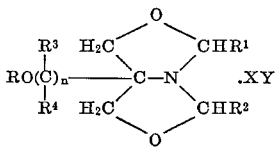

wherein R is

—C(O)CH=CH$_2$, —C(O)C=CH$_2$, —C(O)CH$_2$C—CH$_2$,
                  |                  |
                  CH$_3$              COOH

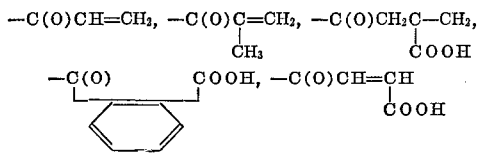

—C(O)CH=CHCOO(C)$_n$— or the like; $R^1$, $R^2$, $R^3$, and $R^4$ is each —H, —C$_6$H$_5$, an alkyl group having from 1 to 20 carbon atoms, an aryl or an alkyl group having halogen, merceptan, disulfide, alkene, peroxy, carbonyl, amide, amine, carboxyl, hydroxyl, or the like, substitution and may be the same or different; $n$ is an integer from 0 to 20, XY may be absent, or X may be —H, an alkyl group having 1 to 20 carbon atoms, phenyl, benzyl, substituted phenyl, substituted benzyl, or other condensed aromatic radical, or the like, and Y may be —Cl, —Br, —I, —SO$_3$C$_6$H$_4$CH$_3$, OC$_6$H$_2$(NO$_2$)$_3$, —HSO$_4$, —H$_2$PO$_4$, —NO$_3$, or the like, or Y may be absent and X may be BF$_3$, FeCl$_3$, AlCl$_3$, or the like, have been prepared which are radiation-susceptible, making them suitable for a variety of end uses, such as for example inks, coating compositions, adhesives, textile and paper finishing agents, and the like.

The monomeric esters are produced, for example, by reacting 1-aza-5-hydroxymethyl-3,7-dioxabicyclo [3.3.0] octane (II) with an appropriate reactant, e.g., an acid chloride, acid anhydride, or alkyl ester, in an inert solvent at a temperature of about —5° to 150° C. The general reaction for preparing these esters and salts may be illustrated by the following equations in which R, $R^1$, $R^2$, $R^3$, $R^4$, X, and $n$ are as defined above and Z is halogen, alkoxy, or a carboxy substituted alkyl group having about 1 to 20 carbon atoms:

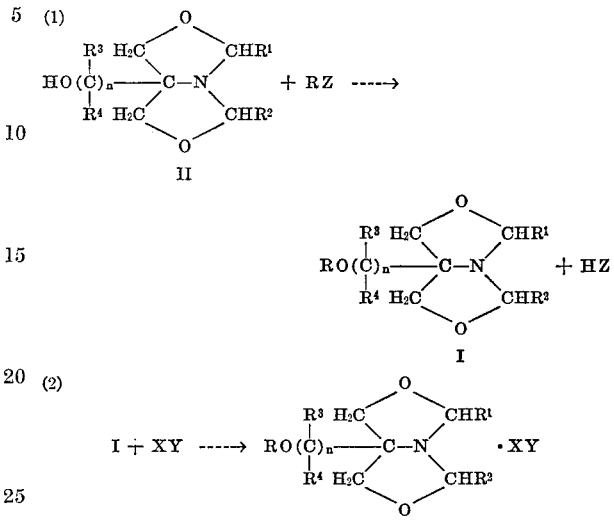

Examples of the monomers include, but are not limited to, 1-aza-5-acryloxymethyl-3,7-dioxabicyclo [3.3.0] octane,
1-aza-5-methacryloxymethyl-3,7-dioxabicyclo [3.3.0] octane,
1-aza-5-itaconyloxymethyl-3,7-dioxabicyclo [3.3.0] octane, and the following substituted 1-aza-3,7-dioxabicyclo [3.3.0] octanes:

1-aza-2-propyl-5-acryloxymethyl-3,7-dioxabicyclo [3.3.0] octane,
1-aza-2-propyl-5-methacryloxymethyl-3,7-dioxabicyclo [3.3.0] octane,
1-aza-2,8-dipropyl-5-acryloxymethyl-3,7-dioxabicyclo [3.3.0] octane,
1-aza-2,8-dipropyl-5-methacryloxymethyl-3,7-dioxabicyclo [3.3.0] octane,
1-aza-2-phenyl-5-acryloxymethyl-3,7-dioxabicyclo [3.3.0] octane,
1-aza-2,8-diphenyl-5-acryloxymethyl-3,7-dioxabicyclo [3.3.0] octane,
1-aza-2,8-diphenyl-5-methacryloxymethyl-3,7-dioxabicyclo [3.3.0] octane,
1-aza-2-(4'-chlorophenyl)-5-acryloxymethyl-3,7-dioxabicyclo [3.3.0] octane,
1-aza-2,8-di-(4'-chlorophenyl)-5-acryloxymethyl-3,7-dioxabicyclo [3.3.0] octane,
1-aza-2-(4'-chlorophenyl)-5-methacryloxymethyl-3,7-dioxabicyclo [3.3.0] octane,
1-aza-2,8-di(4'-chlorophenyl)-5-methacryloxymethyl-3,7-dioxabicyclo [3.3.0] octane,
1-aza-2-(3',4'-dichlorophenyl)-5-acryloxymethyl-3,7-dioxabicyclo [3.3.0] octane,
1-aza-2-(3',4'-dichlorophenyl)-5-methacryloxymethyl-3,7-dioxabicyclo [3.3.0] octane,
1-aza-2-(2',4'-dichlorophenyl)-5-acryloxymethyl-3,7-dioxabicyclo [3.3.0] octane,
1-aza-2-(2',4'-dichlorophenyl)-5-methacryloxymethyl-3,7-dioxabicyclo [3.3.0] octane,
1-aza-2-(4'-methoxyphenyl)-5-acryloxymethyl-3,7-dioxabicyclo [3.3.0] octane,
1-aza-2,8-di(4'-methoxyphenyl)-5-acryloxymethyl-3,7-dioxabicyclo [3.3.0] octane,
1-aza-2-(4'-methoxyphenyl)-5-methacryloxymethyl-3,7-dioxabicyclo [3.3.0] octane, 1-aza-2,8-di (4'-methoxyphenyl)-5-methacryloxymethyl-3,7dioxabicyclo [3.3.0] octane,
1-aza-2-(4'-nitrophenyl)-5-acryloxymethyl-3,7-dioxabicylclo [3.3.0] octane,
1-aza-2,8-di (4'-nitrophenyl)-5-acryloxymethyl-3,7-dioxabicyclo [3.3.0] octane,
1-aza-2-(4'-nitrophenyl)-5-methacryloxymethyl-3,7-dioxabicyclo [3.3.0] octane,
1-aza-2,8-di(4'-nitrophenyl)-5-methacryloxymethyl-3,7-dioxabicyclo [3.3.0] octane,
2,2'-bi(1-aza-5-acryloxymethyl-3,7-dioxabicyclo [3.3.0] octane),
2,2'bi(1-aza-5-methacryloxymethyl-3,7-dioxabicyclo [3.3.0] octane,
1-aza-2-(4'-nitrophenyl)-5-itaconyloxymethyl-3,7-dioxabicyclo [3.3.0] octane,
1-aza-2,4'-methoxyphenyl-5-itaconyloxymethyl-3,7-dioxabicyclo [3.3.0] octane,
and the like, and their salts, and mixtures thereof.

The reaction with acid chloride is carried out at temperatures ranging from about −5° to 150° C., with temperatures of about 0° to 10° C. being preferred. The reaction pressure may range from about 5 to 50 p.s.i., preferably about 10 to 20. In general the reaction takes place in an inert organic solvent, e.g., benzene, toluene, xylene, chloroform, methylene chloride, ethylene dichloride, carbon tetrachloride, or the like.

Although generally equimolar amounts of 1-aza-5-hydroxymethyl-3,7-dioxybicyclo [3.3.0] octane (III) and the acid chloride are employed in the reaction, the ratio of II to the acid chloride may range from about 3 to 1:1 to 2.

Optionally an HCl scavenger may be used, such as for example triethylamine, tripropylamine, tributylamine, butyldimethylamine, triamylamine, amyldiethylamine, amyldimethylamine, or the like, in an amount ranging from about 25 to 300, and preferably about 75 to 150, percent, based on the weight of the reactants.

If desired, the reaction may be carried out by the ester interchange method of interacting a lower alkyl ester of methacrylic acid, acrylic acid, or itaconic acid with the alcohol in the presence of a suitable catalyst, such as for example dibutyltin oxide, dimethyltin oxide, diphenyltin oxide, aluminum isopropoxide, titanium tetraisopropoxide, titanium tetrabutoxide tetraisopropyl titanate, tetrabutyl titanate, and the like, and their mixtures, in amounts ranging from about 0.05 to 4, and preferably about 0.2 to 0.8, percent, based on the weight of the reactants.

Useful inhibitors include hydroquinone, catechol, 1,4-naphthaquinone, o-xyloquinone, p-toluoquinone, tetrachloro - p - benzoquinone, trichloroquinone, phenanthrene quinone, pyrogallol, phenothiazine, or a dry oxygen sparge in combination with any of the above.

The starting alcohols may be prepared by known procedures which form no part of the instant invention. Thus, for example, 1-aza-5-hydroxymethyl - 3,7 - dioxybicyclo [3.3.0] octane can be readily prepared by the methylolation of tris(hydroxymethyl) aminomethane (THAM) according to the following equation:

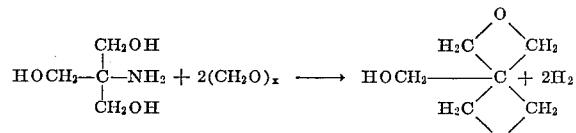

Substituted 1-aza-3,7-dioxabicyclo [3.3.0] octanes may be prepared in a similar way by using THAM with the appropriate aldehyde or ketone. Instead of THAM, suitable *beta*-alkylol amines may be used.

The esters thus-formed may be converted into novel salts by reaction with, for example, p-toluene sulfonic acid, picric acid, methyl chloride, methyl bromide, methyl iodide, hydrochloric acid, nitric acid, phosphoric acid, and so forth, for use in, e.g., polymerizable dyes by dye/monomer salt formation, polymerizable emulsifying agents, water-solubilizing comonomers, surface - active agents, radiation-crosslinkable films, polymerizable chemical catalysts, and as radiation-sensitive water-soluble crosslinking agents.

The copolymers of the instant invention are prepared by copolymerizing at least one of these esters or salts with at least one copolymerizable ethylenically unsaturated monomer, i.e., a monomer containing a $CH_2=C<$ group, a $—CH=CH<$ group, a $—CH=C<$ group, or a $>C=C<$ group, such as for example acrylic acid, methacrylic acid, or itaconic acid; esters of acrylic acid, methacrylic acid, itaconic acid, maleic acid, fumaric acid, or citraconic acid with a monohydric alcohol, such as methyl, ethyl, propyl, butyl, cyclohexyl, octyl, dodecyl, cyanoethyl, aminoethyl, and the like; vinyloxyalkyl esters such as vinyloxyethyl acetate; vinyl ethers such as vinyl ethyl ether, vinyl butyl ether, hydroxyethyl vinyl ether, aminopropyl vinyl ether, dimethylaminoethyl vinyl ether, and vinyloxypropoxyethanol; methacrylonitrile or acrylonitrile; acrylamide or methacrylamide and their N-substituted derivatives; vinyl esters such as vinyl chloride, vinyl bromide, vinyl acetate, vinyl butyrate, vinyl propionate, and vinyl stearate; vinylidene esters such as vinylidene chloride, vinylidene fluoride, and vinylidene cyanide; 1-chloro-1-fluoroethylene; ethylene; styrene; substituted styrenes such as methylstyrene, dimethylstyrene, and halogenated styrenes; vinyl ketones such as methyl vinyl ketone, ethyl vinyl ketone, and vinyl phenyl ketone; hydroxy compounds such as ethylene glycol monoacrylate and monomethacrylate, glycerol monoacrylate, hydroxyethyl methacrylate and glycidyl methacrylate; pyridines such as 2-vinylpyridine and 2-methyl - 5 - vinylpyridine; chloroprene and isoprene; cyclopentadiene and substituted cyclopentadienes; and the like.

In making the copolymers of this invention the monomers are copolymerized at a reaction temperature in the range of about 50° C. to 150° C., preferably about 60 to 100° C., and a reaction time of about 2 to 24 hours, preferably about 4 to 8 hours, in the presence of a polymerization initiator or catalyst.

The monomers are reacted in amounts ranging from about 1 to 99 parts by weight of the ester or salt of copending application Ser. No. 44,534 and 99 to 1 parts of the comonomer, preferably the amounts are about 20 to 80: about 80 to 20 parts by weight.

Suitable initiators include azo compounds, such as azobisisobutyronitrile and p-methoxyphenyl diazothio (2-naphthyl) ether, and organic peroxygen compounds such as lauryl peroxide, acetyl peroxide, isopropyl percarbonate, and t-butyl peroxy pivalate.

The copolymerization process is preferably, although not necessarily, carried out in an inert liquid reaction medium. Examples include aliphatic and aromatic hydrocarbons such as pentane, hexane, heptane, heptene-1, isooctane, cyclohexene, cyclohexane, benzene, toluene, and xylene; alkylates; methylene chloride and ethylene chloride; ketones; and the like; and mixtures thereof. The amount of solvent may range up to about 80 parts by weight of the copolymer; preferably the range is about 30 to 70 parts.

Although the copolymers may be cured thermally or in the presence of free-radical producing agents, curing preferably takes place when the copolymer is exposed to a source of radiation, e.g., ultraviolet light or electron beam radiation, under normal aerobic conditions.

By the process of this invention there have been produced new copolymers which have novel crosslinking groups; that is, in addition to the original polymerizable ester groups (acrylate, methacrylate, or itaconate) the monomers possess an internal "active" group, thus enhancing the activity of the compounds to irradiative and chemical curing.

The copolymers exhibit extremely fast photocure rates which are attributed to participation of the organic residue in a radiation-catalyzed photooxidation. Accordingly, the copolymers possess the stability associated with true polymers, but under certain conditions they can be utilized as functionally active materials.

It is believed that the active principle whereby the polymers enter the accelerated crosslinking/grafting reactions is essentially a photooxidation of the bicyclic moiety followed by rapid decomposition of the initial hydroperoxide leading to the generation of radicals that can participate in a crosslinking reaction.

Reactive intermediates can account for the rapid cure and crosslinking mechanisms. For example, free radicals formed by decomposition of reactive intermediates can initiate polymerization and abstract hydrogen atoms to generate free radicals at crosslinking sites.

The good cure rates of these polymers materials may be further improved, if desired, by the addition of a photoinitiator. Any suitable photoinitiator or sensitizer may be used, such as for example an acyloin, such as benzoin; an acyloin derivative, such as benzoin methyl ether, benzoin ethyl ether, desyl bromide, desyl chloride, desyl amine, and the like, and mixtures thereof; a halogenated aliphatic, aromatic, or alicyclic hydrocarbon or a mixture thereof, wherein the halogen may be chlorine, bromine, iodine, or fluorine, including, for example polyhalogenated polyphenyl resins; chlorinated rubbers, such as the Parlons (Hercules Powder Co.); copolymers of vinyl chloride and vinyl isobutyl ether, such as Vinoflex MP-400 (BASF Colors and Chemicals Inc.); chlorinated aliphatic waxes, such as Chlorowax 70 (Diamond Alkali Co.); perchloropentacyclodecane, such as Dechlorane+ (Hooker Chemical Co.); chlorinated paraffins, such as Clorafin 40 (Hooker Chemical Co.) and Unichlor-70B (Neville Chemical Co.); the Hetrons (Hooker Chemical Co.); mono- and polychlorobenzenes; mono- and polybromobenzenes; mono- and polychloroxylenes; mono- and polybromoxylenes; dichloromaleic anhydride; 1-(chloro - 2 - methyl) naphthalene; 2,4-dimethylbenzene sulfonyl chloride; 1-bromo - 3 - (m-phenoxyphenoxy benzene); 2 - bromoethyl methyl ether; chlorendic anhydride; chloromethylnaphthyl chloride; chloromethyl naphthalene; bromomethyl phenanthrene; diiodomethyl anthracene; hexachlorocyclopentadiene; hexachlorobenzene; ketones, such as benzophenone, acetophenone, ethyl methyl ketone, benzil, cyclopentanone, caprone, benzoyl cyclobutanone, and dioctyl acetone; substituted ketones such as N,N-dimethylamino benzophenone, tribromoacetophenone, and trichloroacetophenone; polynuclear quinones such as benzoquinone and anthraquinone; substituted polynuclear quinones such as 1-chloroanthraquinone, 2-methylanthraquinone, and 2,3-diphenylanthraquinone; and so forth; and mixtures of these. In addition, amine accelerators such as n-propylamine tribenzylamine, triethanolamine, and the like, as well as photo-oxidation promoters such as rose bengal, eosin, and methylene blue may be used in conjunction with the photosensitizers.

The ratio of the amount of the copolymers to the photoinitiator in the composition may range from about 98:2 to about 20:80, and preferably from about 80:20 to about 20:80.

Conventional colorants, i.e., pigments or dyes, may be used in conventional quantities in the formulations of this invention. Suitable organic and inorganic pigments include carbon black, zinc oxide, titanium dioxide, phthalocyanine blue, phthalocyanine green, benzidine yellow, naphthol yellow lake, cadmium orange, cadmium yellow, chrome yellow, Prussian blue, bronze blue, chrome green, peacock blue lake, milori blue, ultramarine blue, red lake C, para red, toluidine red, sodium lithol red, barium lithol red, lithol rubine, molybdated scarlet chrome, ferric oxide, aluminum hydrate, and the like. The vehicle may be used, for example, in an amount ranging from about 20 to 99.9 percent of the weight of the total composition and a colorant from about 0.1 to 80 percent of the weight of the total composition.

Other commonly known modifiers can be incorporated into the formulations using the copolymers of the present invention. These include monomeric solvents, plasticizers; wetting agents for the colorant, such as dichloromethylstearate and other chlorinated fatty esters; leveling agents, such as lanolin, paraffin waxes, and natural waxes; and the like. Such modifiers are generally used in amounts ranging from about 1 to 3 percent by weight, preferably about 1 percent, based on the total weight of the formulation.

The formulations may be prepared in any convenient manner, such as, for example, in a three-roll mill, a sand mill, a ball mill, a colloid mill, or the like, in accordance with known dispersion techniques. The resulting composition is applied in any suitable manner onto a substrate.

Variables which determine the rate at which a radiation-curable composition will dry include the specific ingredients in the composition, the concentration of the photoinitiator, the thickness of the material, the nature and intensity of the radiation source and its distance from the material, the presence or absence of oxygen, and the temperature of the surrounding atmosphere. Irradiation may be accomplished by any one or a combination of a variety of methods. The composition may be exposed, for example, to actinic light from any source and of any type as long as it furnishes an effective amount of ultraviolet radiation, since the compositions of this invention activatable by actinic light generally exhibit their maximum sensitivity in the range of about 1800 A. to 4000 A., and preferably about 2000 A. to 3000 A.; electron beams; gamma radiation emitters; and the like; and combinations of these. Suitable sources include, but are not limited to, carbon arcs, mercury-vapor arcs, fluorescent lamps with special ultraviolet light-emitting phosphors, argon glow lamps, photographic flood lamps, Van der Graaff accelerators, Resonant transformers, Betatrons, linear accelerators, gamma radiation emitters, and so forth, and combinations of these.

The time of irradiation must be sufficient to give the effective dosage. Irradiation may be carried out on any convenient temperature, and most suitably is carried out at room temperature for economic reasons. Distances of the radiation source from the work may range from about ⅛ to 10 inches, and preferably from about ⅛ to 7 inches.

The novel compounds of this invention cure rapidly to films that are flexible; possess good adhesion to many substrates; have good shelf stability; have good resistance to organic solvents and water; and are rub-resistant. Inks, coatings, adhesives, and the like made from the compounds of this invention are solvent-free and dry almost instantaneously in air at ambient temperature, thus eliminating the need for ovens as well as avoiding the air pollution, fire hazards, odor, and so forth, that accompany the use of volatile solvents. The inks and coatings form extremely hard and durable films on a wide variety of substrates, such as, for example, paper; newsprint; coated paper stock; irregular, e.g., corrugated, board; metal, e.g., foils, meshes, cans, and bottle caps; wood; rubbers; polyesters, such as polyethylene terephthalate glass; polyolefins, such as treated and untreated polyethylene and polypropylene; cellulose acetate; fabrics such as cotton, silk, and rayon; and the like. They exhibit no color change in the applied film when subjected to the required curing conditions and they are resistant to flaking; smudging; salt spray; scuffing; rubbing; and the deteriorating effects of such substances as alcohols, oils, and fats. In addition, the copolymers of this invention withstand both heat and cold, making them useful, for example, in printing inks or coatings for containers that must be sterilized, e.g., at about 150° C. under pressure, and/or refrigerated, e.g., at less than −20° C.; and so forth. They can be used in textile and paper treating systems. Because they cure on weathering to crosslinked water-resistant substances, these copolymers are suitable for use as overcoats for substrates such as wood, metal, concrete, and non-durable plastics.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein. Unless otherwise specified, all parts are given by weight.

EXAMPLE 1

A. 1-Aza-5-Acryloxymethyl-3,7-Dioxabicyclo [3.3.0] Octane (ADOZ)

To a 1-liter, three-necked reaction flask equipped with stirring motor, reflux condenser, addition funnel, calcium chloride drying tube, and nitrogen inlet was added 29.0 parts (0.20 mole) of 1-aza-5-hydroxymethyl-3,7-diazabicyclo [3.3.0] octane dissolved in 710 ml. of benzene. To this was added 0.5 part of hydroquinone and 40.5 parts (0.4 mole, 100 percent excess) of triethylamine, and the resultant solution was cooled with stirring to 0° C. A nitrogen gas sweep was started, and 18.0 parts (0.20 mole) of acryloyl chloride dissolved in 40 ml. of benzene was added dropwise over a five-hour period, the reaction temperature being maintained at 0–5° C. by means of an ice-water bath. The mixture was stirred overnight at room temperature and then filtered. 23.2 Parts (84.4 percent) of triethylamine hydrochloride was isolated. The filtrate was washed three times with saturated cold NaCl solution, dried with anhydrous magnesium sulfate, and stripped on a rotary evaporator. A yellow solid was isolated and recrystallized three times from acetone in a Dry Ice bath to give a white solid melting at 46–47° C. (55 percent of theory) and identified as 1-aza-5-acryloxymethyl-3,7-dioxabicyclo [3.3.0] octane (ADOZ).

Its IR spectrum showed the following absorptions (microns): 5.82 (carbonyl), 6.12 (vinyl), 8.10 (ester), and 12.3 (vinyl). The monomer exhibited a UV spectrum typical of acrylates, showing a strong absorption at 210 m$\mu$, a weak band at 252 m$\mu$, a shoulder at 272 m$\mu$, and a broad band centered at 324 m$\mu$.

Analysis of $C_9H_{13}NO_4$:

|  | C | H | N | O |
|---|---|---|---|---|
| Calculated | 54.26 | 6.58 | 7.03 | 32.13 |
| Found | 54.04 | 6.77 | 6.93 | 32.26 |

The crystalline solid monomer was soluble in water (~10%), methanol, benzene, ethylenedichloride, chloroform, ethyl ether, and acetone, and insoluble in hexane.

B. When exposed to radiation at a distance of 3 inches from a 550-watt ultraviolet lamp for less than 1 second, a thin deposit of crystalline monomer could not be redissolved in the above solvents which are known to effect solution of the uncrosslinked polymerized monomer. When 50 parts of the monomer ADOZ was dissolved in 50 parts of the corresponding methacrylate (described in Example 2 below) as the reactive diluent and the uninitiated solution photolyzed at 1⅓ inch from a 2100-watt Hanovia lamp, the system cured in 15 seconds to a polymer film.

EXAMPLE 2

A. 1-Aza-5-Methacryloxymethyl-3,7-Dioxabicyclo [3.3.0] Octane (MADOZ)

To a 1-liter, 3-necked round-bottomed reaction flask equipped with a stirring motor, a thermometer, distilling head, reflux condenser, air inlet, and heating mantle was added 514 parts (4.5 moles) of ethyl methacrylate, 132 parts (0.9 mole) of 1-aza-5-hydroxymethyl-3,7-dioxabicyclo [3.3.0] octane, 3.0 parts of dibutyltin oxide, and 6.0 parts of hydroquinone. The reaction mixture was stirred with air being introduced below the surface and heated to reflux for about one hour. The ethanol-ethyl methacrylate azeotrope (b.p. 83–100° C.) was collected, amounting to about 100 ml. In a period of over about nine hours the pot temperature went from 118° to 130° C. and the vapor temperature rose rapidly near the end to 115° C. The reaction solution was filtered and stripped on the rotary evaporator to give a dark liquid which was distilled to give a main product fraction (b.p. 90–96°/ 0.2 mm.) amounting to 155 parts (81 percent of theory). Redistillation gave a clear liquid (b.p. 85°/0.2 mm., $n_D^{25}$ 1.4795) which was shown to be greater than 96 percent pure by gas-liquid phase chromatography analysis through a 20% Carbowax 20 M on 60–80 Chromosorb W column at 200° C. The IR spectrum of the product, 1-aza-5-methacryloxymethyl-3,7-dioxabicyclo [3.3.0] octane (MADOZ), showed the following significant absorptions (microns): 5.8 (carbonyl), 6.15–6.20 (vinyl), 8.4–8.6 (ester), and 12.2 (vinyl). The monomer's UV spectrum (methanol) showed major absorptions at 212 m$\mu$ and 245 m$\mu$ (shoulder).

Analysis of $C_{10}H_{15}NO_4$:

|  | C | H | N | O |
|---|---|---|---|---|
| Calculated | 56.32 | 7.09 | 6.57 | 30.02 |
| Found | 56.29 | 7.24 | 6.56 | 29.91 |

It was partially soluble in water; insoluble in hexane; and soluble in methanol, benzene, and ethylenedichloride.

B. The monomer was exposed to ultraviolet radiation as in Example 1(B). It cured to a non-sticky flexible film in about 20 seconds.

C. A mixture of 70 parts of the monomer of part (A) and 30 parts of benzophenone was exposed to ultraviolet radiation as in Example 1(B). The mixture cured to a dry flexible film in about 3.5 seconds.

EXAMPLE 3

1-Aza-5-Acryloxymethyl-3,7-Dioxabicyclo [3.3.0] Octane-methyl iodide

To one part of ADOZ dissolved in 2 cc. of methanol was added 1.42 parts (100 percent excess) of methyl iodide, and the resultant solution was stored at room temperature for 2½ days. Dilution with diethyl ether gave an oil which crystallized on standing in an ice-water bath to give 1.6 parts (94 percent) of a yellow solid (m.p. 157–158). Recrystallization of the salt twice from methanol gave a slightly yellow solid (m.p. 161–163).

Analysis of $C_{10}H_{16}NO_4I$:

I:

| Calculated | 37.20 |
|---|---|
| Found | 37.85 |

EXAMPLE 4

1-Aza-5-Acryloxymethyl-3,7-dioxabicyclo [3.3.0] Octane-p-Toluenesulfonic Acid Salt To 9.95 parts (0.05 mole) of ADOZ dissolved in 30 ml. of acetone was added slowly with stirring a solution of 10.76 parts (0.0625 mole, 25 percent excess) of p-toluenesulfonic acid dissolved in 70 ml. of acetone. A white solid precipitated almost immediately, and stirring was continued for five minutes. The reaction mixture was cooled in an ice-water bath and filtered at the water pump, the solid being washed with 60 ml. of cold acetone and air dried. Approximately 15.2 parts (82 percent) of a white solid was obtained (m.p. 168–170°). Recrystallization from acetone gave pure ADOZ-p-toluenesulfonic acid salt (m.p. 164–165°).

Analysis of $C_{16}H_{21}NO_7S$:

|  | C | H | N | O | S |
|---|---|---|---|---|---|
| Calculated | 51.74 | 5.70 | 3.77 | 30.16 | 8.63 |
| Found | 51.75 | 5.14 | 4.05 | 30.51 | 8.75 |

EXAMPLE 5

1-Aza-5-Methacryloxymethyl-3,7-Dioxabicyclo [3.3.0] Octane-p-Toluenesulfonic Acid Salt The process of Example 4 was repeated except that MADOZ was reacted with p-toluenesulfonic acid in acetone to give the MADOZ-p-toluenesulfonic acid salt (m.p. 175–177°).

EXAMPLE 6

1-Aza-5-Acryloxymethyl-3,7-dioxabicyclo [3.3.0] Octane-Picric Acid Salt

To about 2.0 parts (0.01 mole) of ADOZ dissolved in 5 ml. of acetone was added 2.3 parts (0.01 mole) of picric acid dissolved in 5 ml. of acetone. In less than 10 seconds a yellow solid separated (m.p. 147–151°) which was recrystallized from hot benzene to give an intensely yellow solid (m.p. 149°).

Analysis of $C_{15}H_{16}N_4O_{11}$:

|  | C | H | N |
|---|---|---|---|
| Calculated | 42.06 | 3.77 | 13.08 |
| Found | 42.35 | 3.37 | 13.78 |

EXAMPLE 7

1-Aza-5-Acryloxymethyl-2,8-di-n-propyl-3,7-dioxabicyclo [3.3.0] Octane (ADOP)

To 150 parts (1.5 mole) of ethyl acrylate was added 1.0 part of dibutyltin oxide, 2.0 parts of p-methoxyphenol, and 68.7 parts (0.3 mole) of 1-aza-5-hydroxymethyl-2,8-di-n-propyl-3,7-dioxabicyclo [3.3.0] octane. The reaction mixture was heated to reflux and an ethanol/ethyl acrylate azeotrope boiling at about 89–91° was collected over a period of five hours, amounting to about 80 ml. The crude reaction solution was filtered, stripped on the rotary evaporator, and distilled to give about 67 parts (79 percent) of a liquid that boiled mainly at 108–109°/0.1 mm.

Analysis of $C_{15}H_{25}NO_4$:

|  | C | H | N | O |
|---|---|---|---|---|
| Calculated | 63.58 | 8.89 | 4.94 | 22.59 |
| Found | 63.84 | 8.88 | 4.99 | 22.29 |

EXAMPLE 8

1-Aza-2-propyl-5-Acryloxymethyl-3,7-Dioxabicyclo [3.3.0] Octane

To 56 parts of (0.30 mol) of 1-aza-2-propyl-5-hydroxymethyl-3,7-dioxabicyclo [3.3.0] octane (b.p. 78–81°/0.10 mm.) dissolved in 150 parts (1.5 mole) of ethyl acrylate was added 2.0 parts (2.7 mole percent) of dibutyltin oxide and 1.0 part of p-methoxyphenol. The mixture was heated to reflux and an ethanol/ethyl acrylate azeotrope was collected amounting to 100 ml. Ethyl acrylate was added during the reaction in an equal amount to that collected. Workup in the usual way followed by fractional distillation at reduced pressure gave a clear liquid fraction (b.p. 104–105°/0.20 mm.) that showed an IR spectrum in accordance with the expected structure.

EXAMPLE 9

1-Aza-2-(3′,4′-dichlorophenyl)-5-Acryloxymethyl-3,7-Dioxabicyclo [3.3.0] Octane To about 26 parts (0.09 mole) of 1-aza-2-(3′,4′-dichlorophenyl-5-hydroxymethyl-3,7-dioxabicyclo [3.3.0] octane, obtained by the stepwise condensation of THAM with 3,4-dichlorobenzaldehyde and then paraformaldehyde, dissolved in 250 parts (2.5 mole) of ethyl acrylate was added 1.0 part of dibutyltin oxide and 1.0 part of p-methoxyphenol, the resulting mixture being refluxed for 6 hours; about 65 ml. of ethanol/ethyl acrylate azeotrope was collected and an equal amount of fresh ethyl acrylate was added. Workup in the usual way gave a light green liquid which showed the expected IR spectrum. The monomer was too high-boiling to be purified by fractional distillation, but no residual alcohol absorption on the stripped sample indicated good purity.

EXAMPLE 10

The procedure of Example 2(C) was repeated except that each of the following was used as the photoinitiator instead of benzophenone: benzoin methyl ether, benzoin ethyl ether, Parlon (Hercules Powder Co.'s chlorinated rubber), perchloropentacyclodecane, 2-bromoethyl methyl ether, chlorendic anhydride, polybromoxylene, Chlorowax 70 (Diamond Alkali Co.'s chlorinated aliphatic wax), acetophenone, trichloroacetophenone, Michler's ketone, a 2:1 mixture of Michler's ketone: benzil, a 1:1 mixture of benzophenone: benzil, and dicumylperoxide. The results were comparable.

EXAMPLE 11

(A) | Parts by weight
---|---
ADOZ (Example 1(A)) | 1
Butyl acrylate | 1
Ethylene dichloride | 10
Azobisisobutyronitrile | 0.02

The above ingredients were degassed, placed in a nitrogen-flushed vial, and held at a temperature of 60° C. for 24 hours under an inert atmosphere with continuous agitation. There was an 80 percent conversion of the monomeric material to the copolymer.

(B) A thin film (0.25 mil) of the copolymer was applied to a sheet of uncoated tin plate and then exposed to a 550-watt ultraviolet lamp at a distance of 3 inches. The film dried in 3 minutes.

EXAMPLE 12

The procedure of Example 11 was repeated with varying amounts of the ADOZ and butyl acrylate with following results:

TABLE

| ADOZ, parts | Butyl acrylate, parts | Cure time, minutes | |
|---|---|---|---|
| | | Slight | Tack-free |
| 5 | 95 | 10 | 30 |
| 15 | 85 | 5 | 10 |
| 25 | 75 | 3 | 5 |
| 75 | 25 | 2 | 3 |
| 95 | 5 | 1 | 2 |

EXAMPLE 13

The procedure of Example 11 was repeated with the following ingredients:

| | Parts by weight |
|---|---|
| ADOZ | 1 |
| Styrene | 1 |
| Ethylene dichloride | 10 |
| Azobisisobutyronitrile | 0.02 |

The copolymer cured in about 2 minutes.

EXAMPLE 14

The procedure of Example 11 was repeated with the following ingredients:

| | Parts by weight |
|---|---|
| MADOZ (Example 2) | 1 |
| Butyl acrylate | 1 |
| Benzene | 10 |
| Azobisisobutyronitrile | 0.02 |

The copolymer cured in 2 minutes.

EXAMPLE 15

The procedure of Example 11 was repeated with the following ingredients:

| | Parts by weight |
|---|---|
| ADOZ | 1 |
| Styrene | 1 |
| Benzene | 10 |
| p-Methoxyphenyl diazothio (2-naphthyl) ether | 0.02 |

The copolymer cured in 2 minutes.

EXAMPLE 16

The procedure of Example 11 was repeated with the following ingredients:

| | Parts by weight |
|---|---|
| 1 - Aza-2-propyl-5-acryloxymethyl-3,7-dioxabicyclo [3.3.0] octane (Example 8) | 1 |
| Butyl acrylate | 1 |
| Ethylene dichloride | 10 |
| Azobisisobutyronitrile | 0.02 |

The copolymer cured in 5 minutes.

EXAMPLE 17

The procedure of Example 11 was repeated with the following ingredients:

| | Parts by weight |
|---|---|
| 1 - Aza-2,8-dipropyl-5-acryloxymethyl-3,7-dioxabicyclo[3.3.0] octane (Example 7) | 1.2 |
| Butyl acrylate | 0.8 |
| Benzene | 10 |
| Azobisisobutyronitrile | 0.02 |

The copolymer cured in 9 minutes.

EXAMPLE 18

The procedure of Example 11 was repeated with the following ingredients:

| | Parts by weight |
|---|---|
| ADOZ | 1 |
| Methyl methacrylate | 1 |
| Ethylene dichloride | 10 |
| Azobisisobutyronitrile | 0.02 |

The copolymer cured in 2 minutes.

EXAMPLE 19

The procedure of Example 11 was repeated with the following ingredients:

| | Parts by weight |
|---|---|
| MADOZ | 1 |
| Methyl methacrylate | 1 |
| Ethylene dichloride | 10 |
| Azobisisobutyronitrile | 0.02 |

The copolymer cured in 5 minutes.

EXAMPLE 20

The procedure of Example 11 was repeated except that the ester was 1-aza-2-(3',4'-dichlorophenyl)-5-acryloxymethyl-3,7-dioxabicyclo [3.3.0] octane (Example 9) instead of ADOZ. The copolymer cured in 10 seconds.

EXAMPLE 21

The procedure of Example 11 was repeated with each of the following instead of ADOZ: 1-aza-2(4-'-nitrophenyl)-5-acryloxymethyl-3,7-dioxabicyclo [3.3.0] octane, 1-aza-2-(4'-nitrophenyl) - 5 - methacryloxymethyl - 3,7 - dioxabicyclo [3.3.0] octane, 1-aza-2-(4'-methoxyphenyl)-5-acryloxymethyl-3,7-dioxabicyclo [3.3.0] octane, 1-aza-2-(4'-methoxyphenyl)-5-methacryloxymethyl - 3,7 - dioxabicyclo [3.3.0] octane, the methyl iodide salt of ADOZ, the p-toluenesulfonic acid salt of ADOZ, the p-toluenesulfonic acid salt of MADOZ, and the picric acid salt of ADOZ. The salts were reacted in water: alcohol mixtures using potassium persulfate as the initiator. The results were comparable.

EXAMPLE 22

The procedure of Example 11 was repeated with each of the following comonomers instead of butyl acrylate: alpha-methylstyrene, 2,5 - chlorostyrene, ethyl acrylate, lauryl methacrylate, acrylonitrile, acrylamide, vinyl acetate, vinyl stearate, vinyloxyethyl acetate, vinyl butyl ether, vinylidene chloride, methyl vinyl ketone, cyclopentadiene, 2-vinylpyridine, and Cellosolve acrylate. The results were comparable.

EXAMPLE 23

The procedure of Example 11(B) was repeated with each of the following substrates instead of tin plate: glass, paper, and cardboard. The results were comparable.

EXAMPLE 24

A laminate was made of a film of polymer-coated cellophane and a film of oriented polypropylene with the isolated copolymer of Example 11(A) between the two. The laminate was exposed to ultraviolet light as in Example 11(B), and a tight bond was effected in about 2 minutes.

EXAMPLE 25

The copolymer of Example 15 was used to bond a film of untreated polyethylene to copper foil. A tight bond was effected in 2 minutes.

EXAMPLE 26

A red ink was prepared from 80 percent of a copolymer of 50 ADOZ/50 butyl acrylate and 20 percent of Lithol Rubine red pigment. A glass bottle printed with the ink was exposed to a 500-watt ultraviolet lamp at a distance of 3 inches. The ink dried in 2 minutes. It had excellent adhesion to glass and good grease- and rub-resistance.

EXAMPLE 27

A blue ink was prepared from 85 percent of a copolymer of 56 ADOZ/44 styrene and 15 percent of phthalocyanine blue. Coated paper stock was printed with the ink and subjected to ultraviolet light as in Example 26. After an exposure of 2 minutes, the ink was dry and adhered well to the substrate.

EXAMPLE 28

The procedure of Example 11(B) was repeated except that the coating was a 70:30 mixture of the copolymer and trichloroacetophenone. The coating dried in about 0.25 minute.

EXAMPLE 29

The procedure of Example 28 was repeated except that the photoinitiator was each of the following instead of trichloroacetophenone: benzoin, acetophenone, benzoin methyl ether, polybromobenzene, hexachloroparaxylene, benzophenone, benzil, Michler's ketone, a 5:1 mixture of benzophenone and Michler's ketone, and a 1:1 mixture of benzophenone and benzil. The results were comparable.

EXAMPLE 30

The procedure of Example 24 was repeated except that the adhesive was a 70:30 mixture of the copolymer and trichloroacetophenone. A tight bond was effected in 0.25 minute.

EXAMPLE 31

The procedure of Example 26 was repeated except that a 70:30 mixture of the copolymer and trichloroacetophenone was used instead of the copolymer alone. The ink dried in 0.25 minute.

EXAMPLE 32

The procedure of Example 27 was repeated except that a 70:30 mixture of the copolymer and trichloroacetophenone was used instead of the copolymer alone. The ink dried in 0.25 minute.

EXAMPLE 33

The procedure of Example 28 was repeated with each of the following copolymers instead of ADOZ/butyl acrylate: 56/44 ADOZ/styrene, 50/50 MADOZ/butyl acrylate, 46/54 MADOZ/methyl methacrylate, 50/50 1-aza-2-propyl-5-acryloxymethyl-3,7-dioxabicyclo [3.3.0] octane/butyl acrylate, 60/40 1-aza-2,8-dipropyl-5-acryloxymethyl - 3,7 - dioxabicyclo [3.3.0] octane/lauryl methacrylate, 20/80 ADOZ/butyl acrylate, 80/20 ADOZ/methyl methacrylate, 55/45 ADOZ methyl iodide salt/alpha-methylstyrene, 57/43 ADOZ picric acid salt/ethyl acrylate, and 50/50 MADOZ p-toluenesulfonic acid salt/butyl acrylate. The results were comparable.

EXAMPLE 34

A planographic printing plate was prepared by depositing a 0.2-mil film of 50 ADOZ/50 styrene onto aluminum printing plate stock and exposing the coating through a stencil for 2 minutes under a 550-watt ultraviolet lamp at a distance of 3 inches, whereby the light passed through the clear areas of the stencil and not through the dark areas. The uncrosslinked polymer was removed by scrubbing with xylene. Ink was accepted by the remaining crosslinked polymeric film areas and not by the metal areas.

EXAMPLE 35

The procedure of Example 34 was repeated except that the monomeric material was a 70:30 mixture of 50 ADOZ/50 styrene:trichloroacetophenone. The curing time was 0.5 minute.

EXAMPLE 36

The procedures of Examples 1 through 33 were repeated except that instead of being exposed to ultraviolet light the samples were passed on a conveyor belt beneath the beam of a Dynacote 300,000-volt linear electron accelerator at a speed and beam current so regulated as to produce a dose rate of 0.5 megarad.

These systems produced resinous materials of varying degrees of hardness in films from 0.5 to 20 mils thick having tacky surfaces.

EXAMPLE 37

The procedures of Examples 1 through 33 were repeated except that instead of being exposed to ultraviolet light the samples were exposed to a combination of ultraviolet light and electron beam radiation in a variety of arrangements: ultraviolet light, then electron beam; electron beam, then ultraviolet light; ultraviolet light before and after electron beam; electron beam before and after ultraviolet light; and simultaneous electron beam and ultraviolet light radiation. The results were comparable.

What is claimed is:

1. A photopolymerizable film-forming crosslinking copolymer that consists essentially of (a) about 1–99 percent by weight of units derived from an ethylenically unsaturated monomer and (b) about 1–99 percent by weight of units derived from a compound having the structure

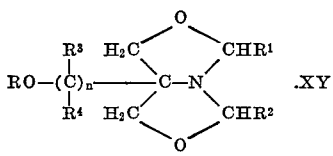

wherein R is

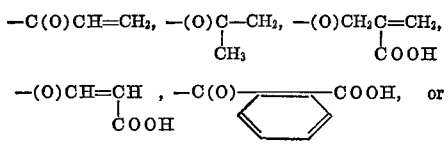

—C(O)CH=CHCOO($\overset{R^3}{\underset{R^4}{C}}$)$_n$—$\overset{H_2C}{\underset{H_2C}{\diagdown}}$ $\overset{O}{\diagup}$ C—N $\overset{CHR^1}{\underset{CHR^2}{\diagup}}$ .XY;

$R^1$, $R^2$, $R^3$, $R^4$ is each —H, $C_6H_5$, an alkyl group of 1 to 20 carbon atoms, an aryl or an alkyl group having halogen, mercaptan, disulfide, alkene, peroxy, carbonyl, amide, amine, carboxyl, or hydroxyl substitution and may be the same or different, n is an integer of 0 to 20; XY may be absent, or X may be —H, an alkyl group of 1 to 20 carbon atoms, phenyl, benzyl, substituted phenyl, or substituted benzyl and Y may be —Cl, Br, —I, —$SO_3C_6H_4CH_3$, —$OC_6H_2(NO_2)_3$, —$HSO_4$, —$H_2PO_4$, or —$NO_3$, or Y may be absent and X may be $BF_3$, $FeCl_3$, or $AlCl_3$.

2. The copolymer of claim 1 wherein the ratio of (a) to (b) is about 20–80:80–20.

3. The copolymer of claim 1 wherein the ethylenically unsaturated monomer is an ester of an ethylenically unsaturated acid.

4. The copolymer of claim 1 wherein the ethylenically unsaturated monomer is styrene.

5. The copolymer of claim 1 wherein the ethylenically unsaturated monomer is a substituted styrene.

6. The copolymer of claim 1 wherein the ethylenically unsaturated monomer is acrylonitrile.

7. The copolymer of claim 1 wherein the ethylenically unsaturated monomer is acrylamide.

8. The copolymer of claim 1 wherein the ethylenically unsaturated monomer is a vinyl ester.

9. The copolymer of claim 1 wherein the ethylenically unsaturated monomer is a vinylidene ester.

10. A radiation-curable printing ink comprising the copolymer of claim 1 and a colorant.

11. The printing ink of claim 10 which additionally comprises a photoinitiator.

12. A radiation-curable coating composition comprising the copolymer of claim 1.

13. The coating composition of claim 12 which additionally comprises a photoinitiator.

14. A radiation-curable adhesive comprising the copolymer of claim 1.

15. The adhesive of claim 14 which additionally comprises a photoinitiator.

16. A photopolymerizable element which comprises a support and a coating thereon of the copolymer of claim 1.

17. The photopolymerizable element of claim 16 wherein the coating additionally comprises a photoinitiator.

18. The copolymer of claim 1 wherein the ratio of (a) to (b) is about 5–95:95–5.

References Cited
UNITED STATES PATENTS
3,507,830   4/1970   Feinaver _____ 260—47

JOSEPH L. SCHOFER, Primary Examiner

J. KIGHT III, Assistant Examiner

U.S. Cl. X.R.

106—20; 117—93.3, 93.31; 161—192, 249; 260—63 R, HA, N, 78.4 R, E, 80.3 R, 85.5 B, ES, 85.7, 86.1 N, E, 86.7, 87.7, 88.1 PC